Figure 1:
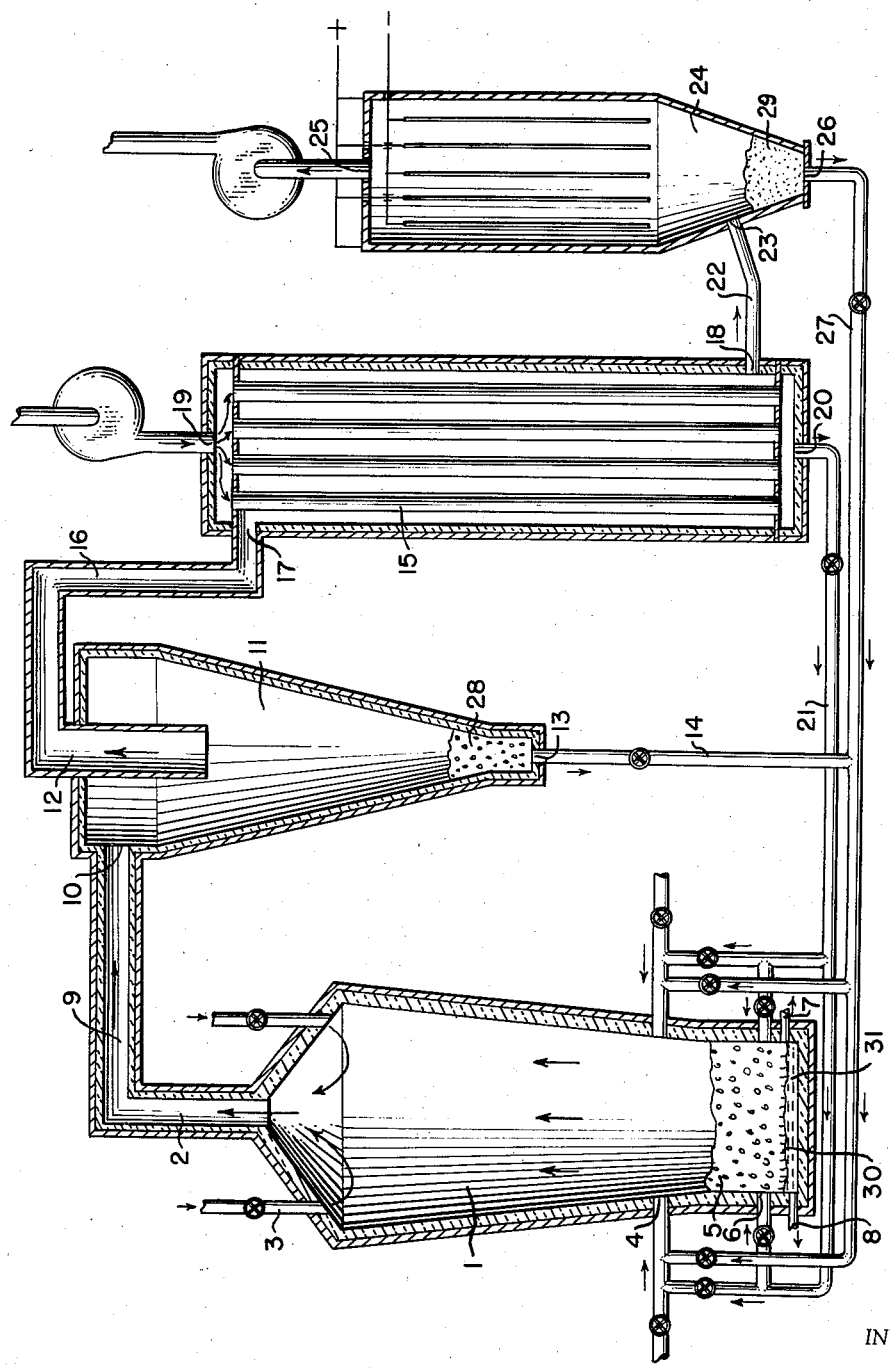

Aug. 5, 1958

W. WENZEL 2,846,300

PROCESS FOR SMELTING ORES

Filed July 15, 1953

2 Sheets-Sheet 1

INVENTOR
WERNER WENZEL

BY *Richard Low*
    *Agt*

2,846,300

PROCESS FOR SMELTING ORES

Werner Wenzel, Godesberg (Rhine), Germany

Application July 15, 1953, Serial No. 368,056

Claims priority, application Germany July 23, 1952

8 Claims. (Cl. 75—26)

The invention relates to a process for smelting powdered or fine grained ores, especially iron ores with gaseous, liquid or powdered or fine grained solid fuels.

Processes are already known in which fine grained iron ore is reduced to FeO or Fe by the turbulent zone process. In the known proposal, for example, a mixture of iron ore and coal with a reducing carrier gas (CO) is conducted thru an externally heated tube system. At the end of the reduction process the reduction material which is still in granular state is passed into a settling chamber in which the gas separates from the granular material so that material is obtained separately in a solid granular state. For several reasons, however, the known proposal has not attained the desired result.

On the other hand a process for smelting powdered or fine grained ores is now proposed which consists in bringing the reaction materials together in the melting (reaction) chamber at a temperature which lies above the melting point of the metallic and slag phases, and maintaining the solid reaction components in suspension by means of the gaseous reaction components until the reaction products have united in a liquid or pasty state to form into larger portions.

The advantage of this process over the known turbulent zone process is—

(1) The possibility of smelting directly to liquid iron even the finest iron dust, (2) The great reduction speeds at high temperatures resulting in apparatus of small dimensions for large charge outputs, (3) Avoidance of difficulties which may result from the caking of the coal and sintering between the different components, (4) The separation of the gangue of the ore and the coal ash from the iron in the form of liquid slag, (5) Accurate control of the entire smelting process by the possibility of precisely dosing all components.

The portion of the fuel serving for the heating is, according to the invention, burnt in the reaction or smelting chamber with a medium containing oxygen. As fuel it is possible to use solid fuels, such as lignite or pit coal—even in dry, distilled or coked condition—liquid fuels or gaseous fuels. The oxygen-containing medium serving for the combustion may be air, air enriched with oxygen, concentrated oxygen or mixtures thereof with carbonic acid gas and/or steam. The use of air or air enriched with oxygen is particularly advantageous in this case because the waste heat of the melting chamber process is thereby reduced.

According to the invention the quantity of oxygen in the combustion medium is so calculated that the contents of carbon dioxide and steam in the gas phase of the melting chamber lie slightly below the equilibrium concentration of $CO_2$ and $H_2O$ over Fe/FeO as solid substance at the temperature of the reaction chamber.

In itself, it is known to carry out the reaction of iron ores with reducing atmospheres. Gas mixures both of pure carbon monoxide and hydrogen and also those containing carbon dioxide and steam up to the equilibruim concentration are considered as reducing atmospheres. It has now been found that the melting chamber smelting process is particularly favorable from the point of view of heat economy and permits of reasonable specific fuel consumption only when the combustion of fuel is such that the gas composition is just below the equilibrium concentration of carbon dioxide and steam.

In this way, a large quantity of heat from the combustion is made available in the melting chamber. This measure is not obvious in that burning the fuel to pure carbon monoxide—hydrogen mixtures or mixtures with low carbon dioxide—steam concentrations in the melting chamber could result in the direct production of pig iron containing manganese and silicon whereby also a carburized iron might be obtained. This manner of working results, however, in unfavorable heat economy in the melting chamber and makes it impossible to obtain a low fuel consumption per unit of iron produced.

According to the invention, the liquid products in the melting chamber are passed thru a coke bed heated to above the melting temperature. The coke bed may be arranged directly in the melting chamber or outside thereof.

This coke bed enables the reduction of the iron oxide content of the slag to be carried out completely, which otherwise would be uncertain or impossible in the melting chamber when working with a gas composition which approximates the state of equilibrium as regards Fe/FeO. The coke bed also renders possible the deoxidation of the iron which, owing to the large quantity of oxygen available in the melting chamber, becomes enriched with FeO.

According to another feature of the invention substances are added to the coke bed in addition to coke or coke-forming coal, which serve to purify and enrich the metal or slag phase, for example $CaO$, $SiO_2$, $Al_2O_3$, $Cr_2O_3$ and the like. The quality of the iron can, according to the invention, also be regulated by varying the depth of the coke bed, in particular the content of carbon and components with high affinity for oxygen, for example Si, Mn and the like.

A portion of the combustion medium is injected into the coke bed continuously or intermittently by auxiliary nozzles arranged in the coke bed.

It is particularly advantageous to introduce into the melting chamber prereduced ore which is preferably preheated. By this the reduction time in the melting chamber is considerably shortened and the heat requirement in the reduction chamber lessened.

The prereduction is preferably carried out either to Fe or FeO and/or to a mixture of the two.

According to the invention, the combustion medium or combustion media are preferably fed into the melting chamber in preheated condition, the preheating being preferably effected by the waste heat from the melting chamber, thereby further saving heat.

An important feature of the invention is that the waste or exhaust gas from the melting chamber is cooled on leaving the chamber to a temperature below the melting temperature of the non-gaseous components contained therein. The cooling of the waste gas from the melting chamber may be effected for example by means of a water circulated pipe system (granulating grid) arranged in the path of the gas. The cooling may also be effected by introducing cold gases or other cold bodies. However, a particularly advantageous way of cooling the waste gases from the melting chamber is to add cold ore dust either in dried or roasted condition.

In another form of the invention, the mixture composed of waste gas and ore dust is fed to a prereduction chamber in which the reduction of oxygen in the ore is carried out until the oxidation stage of the FeO is reached, and the prereduced ore dust is then separated from the waste gas after leaving the prereduction chamber and introduced into the melting chamber.

The prereduction may be carried out in a cyclone, whereby the greater part of the prereduced ore is at the same time separated from the waste gas, or in a known turbulent zone process. The two processes may, however, be carried out in succession, which results in a favorable heat economy.

Moreover, it is proposed according to the invention to cause the waste gas from the melting chamber or that from the prereduction chamber to react at a suitable temperature, for example at 500° C., with ore dust, if desired with prereduced ore dust, for the purpose of separating carbon, and to feed to the melting chamber the separated carbon with the ore.

The waste gas from the melting chamber reduction process has normally still a considerable calorific value, which, owing to the separation of the carbon, can again be utilized to a considerable extent in the smelting process. In many cases, however, it is also possible to use the waste gas directly as heating gas or as synthesizing gas or the like (as synthesizing gas when concentrated oxygen is used in the melting chamber).

It is also very advantageous that the heat which is liberated during the carbon separation may be made available, for example by carrying out the carbon separation by a turbulent zone process and arranging the carbon separation in the turbulent zone of the evaporating tubes of a boiler.

If gas generation is not desired in the melting chamber process, the process can also be carried out according to the invention in such a manner that the waste heat is produced directly in the form of steam. This is done in such a way that the smelting melting chamber has at the same time the function of the melting chamber of a melting chamber boiler in which its waste gases are burned completely in the upper part thereof by injecting secondary air, if desired in preheated condition, and fed to the heating surfaces of the steam boiler provided at the rear end of the plant.

According to the invention, the melting chamber is divided into a reduction melting chamber into which only so much oxygen is introduced that the gas phase thereof does not attain the $CO_2$ and $H_2O$ equilibrium over Fe/FeO, and into an oxidation melting chamber in which the gas phase consists of flue gas, possibly with a slight excess of oxygen.

In this case, the reduction and oxidation melting chambers are arranged one above the other, a constriction or a separate overflow passage being provided between the two. The liquid products of the reduction and oxidation melting chambers may also be recovered separately.

It is particularly advantageous to preheat the combustion medium for the reduction melting chamber to a higher temperature than for the oxidation melting chamber in order to increase the heating efficiency economically.

According to the invention, the quantity of lime required for the smelting process is added to the oxidation melting chamber in the form of limestone dust, the great amount of heat required for the deacidification and melting of the lime being thus obtained at the point of the greatest excess of heat.

It is pointed out generally that the melting chamber process according to the invention can be carried out entirely or in part under increased pressure, for example under a pressure of one atmosphere gauge pressure. The advantage resulting herefrom is accelerated reaction speed and smaller apparatus.

Figure 2:
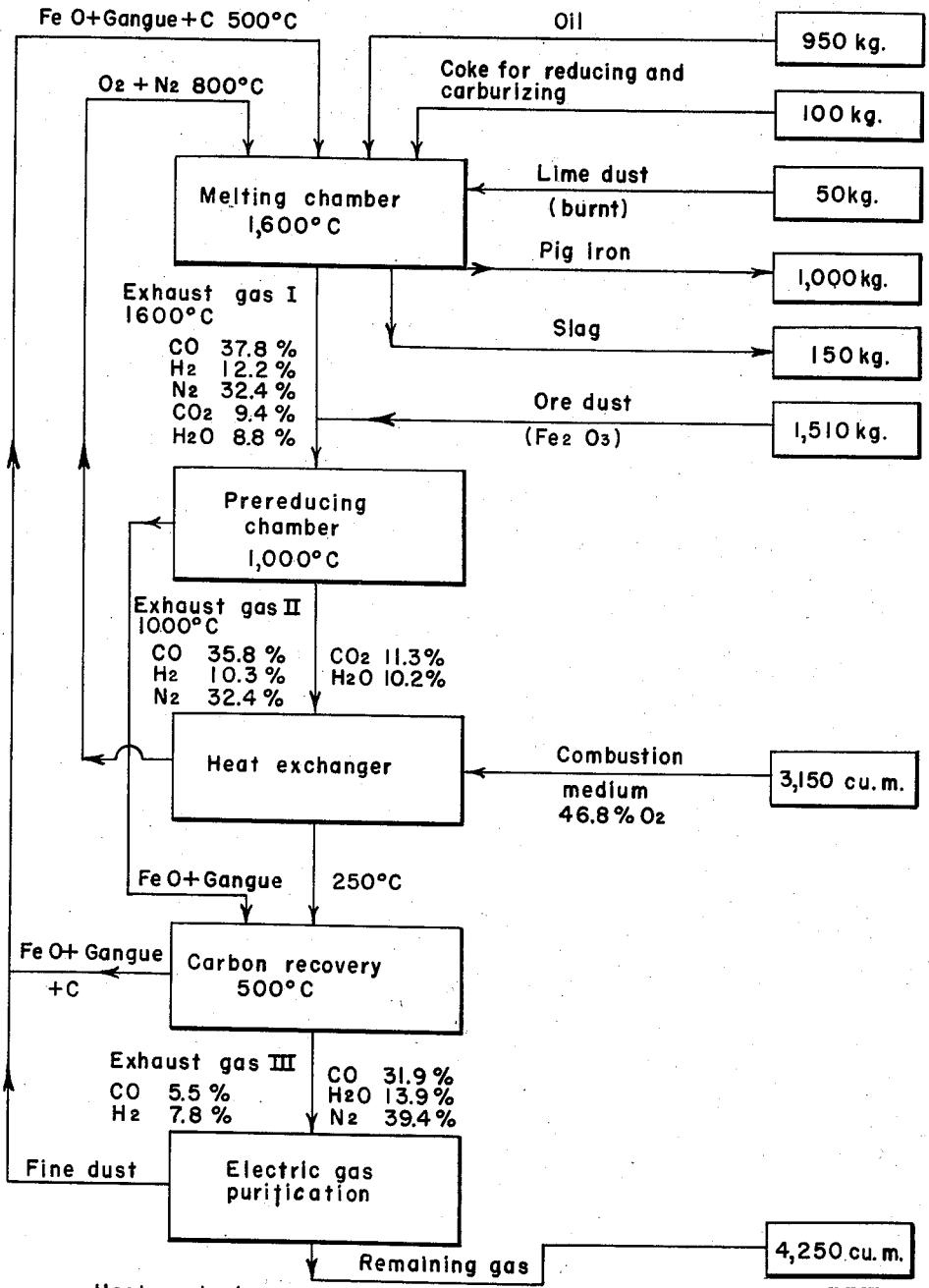

In the drawing the invention is illustrated by way of example as applied to the smelting of ore dust with fine coal, Fig. 1 being illustrative of the smelting furnace and Fig. 2 is a flow sheet of the process.

A reaction chamber or melting chamber 1 has at its upper end a central outlet pipe 2 and feed apertures 3 for the ore, admixtures and coke and at its lower end inlet apertures or blast nozzles 4 for fine coal, as well as auxiliary nozzles 6 in the coke bed 5 for introducing the combustion media and a slag discharge port 7 and an iron discharge port 8. A pipe-line 9 extends from the gas outlet pipe 2 to an aperture 10 in the prereduction chamber 11 which has at the top a gas outlet 12 and at the bottom an outlet 13 for the separated material. A conveyor 14 leads from the outlet 13 to the inlet nozzle 4 of the reaction chamber 1. The prereduction chamber 11 is here shown as a cyclone. This chamber is connected to a heat exchanger 15 by a pipe-line 16 leading from the gas outlet 12 to the gas inlet 17. The gas entering at 17 flows thru the heat exchanger 15 containing a heat exchanging system and leaves the heat exchanger at 18. The cold combustion medium, for example air enriched with oxygen, is introduced into the heat exchanger 15 at 19 and leaves it at 20 in heated state, after which it is fed through the conduit 21 to the inlet nozzles 4 of the reaction chamber 1.

A conduit 22 leads from the gas outlet 18 of the heat exchanger 15 to an electric cleaning installation 24. At the upper end of this installation there is a gas outlet 25 and at the lower end a dust exhausting device 26 which is connected to the inlet nozzle 4 of the reaction chamber 1 by means of a conveying mechanism 27.

The process is carried out in the following manner: A reaction mixture is injected thru the inlet nozzles 4 into the reaction or melting chamber 1. This mixture consists of prereduced ore 28, which is conveyed from the prereduction chamber 11 by the conveyor 14, of fine dust 29 from the electric cleaning installation 24 which is fed to the prereduced ore 28 and mixed therewith, of the fuel (fine coal), and the combustion medium which, consisting for example of air enriched with oxygen, has been preheated in the heat exchanger 15 to a temperature, for instance, of 800° C. In the melting chamber, the fine coal, ore dust and combustion medium react together in the space in front of the injection nozzle 4. Liquid iron and liquid slag form and sink chiefly in the form of drops onto the coke bed 5. In the coke bed 5 the slag is completely reduced, and the iron deoxidized and carburized, with the aid of the lime fed into the melting chamber thru the apertures 3 the iron is desulphurized and enriched with certain alloy components such as manganese, silicon or the like. The slag collects below the coke bed 5 in a coherent layer 31. The slag and the iron are drawn off thru the apertures 7 of the reaction chamber 1 either continuously or intermittently.

The combustion gases forming in the reaction chamber in front of the injection nozzles 4 pass upwards in the reaction chamber and out thru the gas outlet pipe 2. Coke and lime (CaO) or other admixtures are fed into the reaction chamber 1 thru the inlet apertures 3 in lump form and fall counter-current to the upwardly directed gas current onto the coke bed 5. Cold ore dust is also introduced thru the inlet apertures 3 and, owing to its low velocity of descent, it is carried along and at the same time heated by the ascending gas current and passes on to the prereduction chamber 11 thru the gas outlet 2 and line 9. Powdered lime (CaO) or other admixtures may also be added to this ore. Owing to the heating of the ore dust, the temperature of the combustion gas drops quickly from about 1600° C. to about 1000° C.

The cooling of the waste gases from the reaction chamber may be effected by additional or different measures, such as, for example, by water-cooled pipes, in order to bring the temperature of the solid components below the melting or sintering point, so that these components pass with the waste gases into the prereduction chamber 11 at a temperature of about 1000° C. In the prereduction chamber 11, which is shown as a cyclone, the mixture composed of the waste gases from the reaction chamber and the ore dust is blown tangentially thru the inlet 10. Due to the cyclone effect, the reduced ore 28 is here separated and from here it is brought into the reduction space of the reaction chamber 1 thru the outlet 13 and over the conveyor 14. The waste gases freed to a great extent from the ore dust in the cyclone 11 leave thru the central outlet 12 and are fed at a temperature of about 1000° C. thru line 16 to the gas inlet 17 of the heat exchanger 15. The heat exchanger is of the known type with a system of tubes and with the gas to be cooled flowing around the tubes and leaving thru the gas outlet 18. The cold combustion medium is fed into the heat exchanger 15 thru the inlet 19 and heated in known manner in counterflow to the gases to be cooled. It leaves the heat exchanger at a temperature of about 800° C. thru the outlet 20 and is fed thru line 21 to the injector nozzles 4 of the reaction chamber 1. The cooled gas after leaving the heat exchanger 15 thru the gas outlet 18 is conducted by the conduit 22 to the electric gas cleaning installation 24 which it enters thru the inlet 23 at a temperature of about 250° C. The dust 29 is separated in the electric gas cleaning installation in known manner. The cleansed gas leaves thru the outlet 25 and is available for any heating purposes or as a synthetizing gas. At the lower end of the installation 24 the separated dust is drawn off at 26 and fed to the reaction chamber 1 by the conveying means 27.

In accordance with the invention, it is provided that the melting chamber may be of any desired cross section or cross sections and that the reaction components are injected in tangential direction, in counter-direction to each other, in intersecting directions and/or in different planes, the combustion components being preferably introduced in the lower zones with upwardly directed gas current.

So, for example, the melting chamber may be of square cross-sectional shape in which case the reaction material is injected from the corners in the direction of the diagonals of the cross-section. In the case of cylindrical melting chambers the reaction material can be injected tangentially or radially; if the cross-section is oblong it may be advantageous to inject the reaction material from two diametrically opposite walls in two jets directed one towards the other. If a reaction chamber of oval cross-section is used it will be advantageous for the reaction material to be injected from two opposite points in two jets directed one towards the other. In any case the reaction materials can be injected in the same plane or in such a manner that the injection of the fuel and of the combustion medium takes place on a lower plane viewed in the direction of the ascending gas current.

A reaction chamber may also be employed in which the oppositely directed jets of reaction material are of different quality so that, for example, one jet consists of fuel and combustion medium and the oppositely directed jet of ore and an auxiliary gas.

It is particularly advantageous for the melting chamber to be entirely or partly cooled with water. This can be attained, for example, by spraying the shell with water, or by water pipes the spaces between which are filled with a ceramic substance.

Moreover the melting chamber has according to the invention a ceramic lining of a material requiring periodical renewal—such as tar and dolomite bricks, the slagging component of this lining being used as slagging substance for the gangue and ash. The melting chamber may also have a lining composed chiefly of carbon. This may consist of carbon bricks or rammed carbon mass.

In this case the lining can, according to the invention, be continually renewed during work by applying or spraying a substance composed of tar or the like and fine grained refractory material, such as dolomite powder, onto the inner surface of the melting chamber.

Finally it is also proposed to make the lower part and the cover of the melting chamber permanent and the intermediate part exchangeable so that this intermediate part can be removed for replacement or repair. In this instance it may be advisable to cool only the cover and base.

What I claim is:

1. Process for reducing iron ore to metal, comprising introducing into a melting zone iron ores in finely divided form, fuel, and oxygen-containing gas, proportioning the oxygen introduced so that at the operating temperature in the melting zone the contents of carbon dioxide and steam in the gas phase, over Fe/FeO as settled matter, be slightly lower than the equilibrium concentration of the $CO_2$ and $H_2O$, heating the mixture to a temperature above the melting point of the metallic and slag phases, maintaining the solid starting components in suspension, allowing the nongaseous and nonsolid reaction products to form, to agglomerate, and to settle due to greater weight assumed by the agglomerated particles, maintaining a coke bed at the bottom of the melting zone, heating the coke to a temperature above the melting point of the reaction products, allowing the reaction products to pass through the coke during said settling action.

2. In the process according to claim 1, introducing an oxygen-containing gas into the coke bed.

3. In the process according to claim 1, withdrawing exhaust gas from the melting zone, and cooling said gas below the melting temperature of the nongaseous reaction products contained in the exhaust gas by means of cold iron ore.

4. In the process according to claim 2, conducting the mixture of exhaust gas and ore to a prereducing zone, prereducing the ore, separating the prereduced ore from the exhaust gas, and feeding the separated ore to the melting zone.

5. In the process according to claim 1, withdrawing exhaust gas from the melting zone, causing said gas to act upon iron ore at a temperature of about 500° C. to remove carbon from the ore, and feeding the ore freed from carbon and the separated carbon to the melting zone.

6. In the process according to claim 1, introducing said oxygen-containing gas into a portion only of the melting zone, using said portion as a reduction melting chamber, and using the other portion of the melting zone as an oxydation melting chamber.

7. In the process according to claim 6, maintaining in the oxydation melting chamber combustion gases and a slight excess of oxygen.

8. In the process according to claim 6, separately recovering the products formed in the reduction and oxidation melting chambers.

References Cited in the file of this patent

UNITED STATES PATENTS

| | | |
|---|---|---|
| 740,025 | Koneman | Sept. 29, 1903 |
| 1,775,713 | Baily | Sept. 16, 1930 |
| 2,184,300 | Hodson et al. | Dec. 26, 1939 |
| 2,544,697 | Lewis | Mar. 13, 1951 |
| 2,560,470 | Ogorzaly | July 10, 1951 |
| 2,688,478 | Lykken | Sept. 7, 1954 |
| 2,745,733 | Oster | May 15, 1956 |
| 2,750,277 | Marshall | June 12, 1956 |